Patented Mar. 30, 1943

2,314,998

UNITED STATES PATENT OFFICE 2,314,998

METHOD OF ADHERING FIBERS TO RUBBER

Edward T. Lessig and Hal P. Headley, Akron, Ohio, assignors to The B. F. Goodrich Company, New York, N. Y., a corporation of New York No Drawing. Application February 11, 1939, Serial No. 256,011

6 Claims. (Cl. 154—2)

This invention relates to the adhesion of rubber to natural and synthetic organic fibrous materials such as cotton, silk, or artificial silk in the form of cords, fabrics, as well as to fibers and fabrics made of glass, metal, and the like.

The length of service of many articles of commerce embodying rubber and natural or artificial cords and fabrics such as tires and belts for instance, is largely dependent upon the degree of adhesion obtained between the rubber and cord. The industrial importance of such articles has led to a continual search for methods of increasing said adhesion. It is an object of this invention, accordingly, to provide a method whereby a remarkable improvement in adhesion between rubber and natural or artificial fibers may be obtained.

It has previously been proposed to improve the adhesion of rubber to rayon by a treatment at room temperature with a heat-hardening phenol-formaldehyde-latex adhesive.

When this treatment is applied to cotton cords, however, no consistent improvement in the adhesion between the cords and the rubber is obtained. In some cases the adhesion is unaffected, in other cases slight improvements are obtained, but in no case does this treatment consistently produce any marked increase in adhesion.

We have discovered that by treating natural or artificial fibers with a heat-hardening phenol-aldehyde-latex adhesive at elevated temperatures, preferably between 70° and 100° C., superior results are obtained. The adhesion of artificial silk to rubber is markedly increased by the treatment at elevated temperatures instead of room temperatures, and improved adhesion of cotton to rubber is consistently obtained.

Although resorcinol-formaldehyde-latex compositions are preferably employed, other heat-hardening polyhydric-phenol-aldehyde-latex dispersions may be used. The preferred phenolic compounds are the polyhydric phenols having hydroxyl groups in a meta relationship such as resorcinol, phloroglucinol, orcinol, cresorcinol, m-xylorcinol, etc. Although the best results are not obtained by employing phenol alone, the phenolic part of the composition may, if desired, comprise a mixture of phenol and polyhydric-phenols. While formaldehyde, or its polymers, is the preferred aldehyde, other aldehydes such as acetaldehyde or furfural may be substituted for the formaldehyde either wholly or in part. Examples of suitable compositions are disclosed in U. S. Patent No. 2,128,229 issued to Charch and Maney.

The benefits of this invention are ordinarily obtained by treating the cord with polyhydric-phenol-aldehyde-latex adhesive at temperatures between 70° and 100° C., although when even greater adhesion is desired higher temperatures are employed.

The cord need usually be immersed in the heated adhesive for a short time, such as 10 seconds or more, or in any case for a time no longer than that necessary to wet the cord. The treated cord is then thoroughly dried in hot air to remove the moisture and harden the coating. Drying at 185° F. ordinarily hardens the coating sufficiently by the time the water is removed. The cord may be dried under tension, if desired, in the manner well known to those skilled in the art.

To illustrate the improvement in adhesion obtainable by treatments at elevated temperatures, a resorcinol-formaldehyde-latex mixture was prepared by mixing 41.5 gals. of a mixture containing the following:

| | | |
|---|---|---|
| Resorcinol | pounds | 40.5 |
| Formalin (40% solution) | do | 81 |
| Caustic soda | do | .54 |
| Water | gallons | 86.5 | and 58.5 gals. of a mixture containing the following:

| | | |
|---|---|---|
| Latex (38% rubber solids) | pounds | 359 |
| Caustic soda | do | 2.5 |
| Water | gallons | 55 |

Cotton dipped in this dispersion at room temperature sometimes exhibited a slightly increased adhesion to rubber, and sometimes did not adhere to rubber as well. Treatment of cotton cord with this adhesive at 85° C., however, invariably produced a substantial increase in adhesion which was sometimes as great as 150%.

Treatment of rayon cord with the dispersion at room temperature produces an increase in adhesion of the cord to about 350%, but treatment at temperatures of from 100–140° C. produced increases in adhesion of the cord to rubber as great at 700% or more.

Although we have herein disclosed specific embodiments of this invention, it is not our intention to limit the invention thereto, for it will be obvious to those skilled in the art that many modifications are within the spirit and scope of the invention as defined in the appended claims.

We claim:

1. In a method of improving the adhesion of a member of the class consisting of natural and synthetic organic fibers to rubber, the step which comprises wetting the fibers with an aqueous heat-hardening polyhydricphenol-aldehyde-latex dispersion in a heated condition.

2. In a method of improving the adhesion of cotton to rubber, the step which comprises wetting the cotton with an aqueous heat-hardening polyhydricphenol-aldehyde-latex dispersion which is at a temperature of at least 70° C.

3. In a method of improving the adhesion of cotton tire cord to rubber, the step which comprises wetting the cord with an aqueous heat-hardening resorcinol-formaldehyde-latex dispersion which is at a temperature of at least 70° C.

4. A process of improving the adhesion of a member of the class consisting of natural and synthetic organic fibers to rubber which comprises wetting the fibers with an aqueous heat-hardening polyhydricphenol-aldehyde-latex dispersion which is at a temperature of at least 70° C., drying the coated fibers, associating the coated fibers with a vulcanizable rubber composition and vulcanizing the composite product.

5. A product containing vulcanized rubber strongly adhered to a member of the class consisting of natural and synthetic organic fibers, which product has been prepared by the process of claim 4.

6. In a method of improving the adhesion of a member of the class consisting of natural and synthetic organic fibers to rubber, the step which comprises wetting the fibers with an aqueous heat-hardening polyhydricphenol-aldehyde-latex dispersion which is at a temperature between 70 and 140° C.

EDWARD T. LESSIG.
HAL P. HEADLEY.